(12) United States Patent
Wu et al.

(10) Patent No.: US 10,116,396 B1
(45) Date of Patent: Oct. 30, 2018

(54) MILLIMETER-WAVE SOURCELESS RECEIVER

(71) Applicants: Ke Wu, Montreal (CA); Ruizhi Liu, Montreal (CA)

(72) Inventors: Ke Wu, Montreal (CA); Ruizhi Liu, Montreal (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 15/582,013

(22) Filed: Apr. 28, 2017

(51) Int. Cl.
H04B 7/08 (2006.01)
H04B 10/61 (2013.01)
H04B 5/00 (2006.01)
H01Q 21/22 (2006.01)
H01Q 5/22 (2015.01)
H04B 17/27 (2015.01)

(52) U.S. Cl.
CPC ........... *H04B 10/6165* (2013.01); *H01Q 5/22* (2015.01); *H01Q 21/22* (2013.01); *H04B 5/0043* (2013.01); *H04B 7/0885* (2013.01); *H04B 10/616* (2013.01); *H04B 17/27* (2015.01); *H04B 2210/006* (2013.01)

(58) Field of Classification Search
CPC .......... H04B 10/6165; H04B 5/0043; H04B 10/616; H04B 17/27; H04B 2210/006; H01Q 21/22; H01Q 5/22

USPC .......................................................... 398/25
See application file for complete search history.

(56) References Cited

U.S. PATENT DOCUMENTS

| 8,538,275 | B2* | 9/2013 | Essiambre | G02B 6/29311 |
| | | | | 398/143 |
| 2005/0273218 | A1* | 12/2005 | Breed | B60C 11/24 |
| | | | | 701/2 |
| 2012/0293359 | A1* | 11/2012 | Fukuda | G01S 3/48 |
| | | | | 342/107 |

OTHER PUBLICATIONS

Tatu et al., "Direction-of-arrival estimation method based on six-port technology" Jan. 2006, IEE Proceedings Microwaves Antennas and Propagation. 153(3), pp. 263-269.*

(Continued)

*Primary Examiner* — Tesfaldet Bocure (57) ABSTRACT

A receiver includes a planar antenna array including at least three antennas. Each antenna simultaneous receives a local oscillator (LO) signal from a near field region and a radio frequency (RF) signal from a far field region. Each antenna is coupled to a respective quasi-optical mixer. Each quasi-optical mixer includes only passive components and outputs a respective intermediate frequency (IF) signal. The receiver includes two six-port demodulators. Each six-port demodulator receives a different pair of IF signals as input and outputs signals representing baseband power of the pair of IF signals. Each six-port demodulator includes only passive components. The receiver also includes a processor to calculate direction of arrival (DoA) for the LO signal and the RF signal using the output from the six-port demodulators.

9 Claims, 6 Drawing Sheets

(56) References Cited

OTHER PUBLICATIONS

Ferid et al. "Antenna System Using Five Port Demodulator," International Journal of Microwave and Optical Technology, vol. 12, No. 1, Jan. 2017, pp. 1-8.*

Fukuda et al., "Base Station Assisted Communication System for Achieving Local-Oscillator-Less Mobile Stations" Radio-Frequency Integration Technology (RFIT), 2016 IEEE International Symposium.

de la Morena-Álvarez-Palencia et al., "Broadband RF Front-End Based on the Six-Port Network Architecture for Software Defined Radio", MILCOM 2010 IEEE.

* cited by examiner

MILLIMETER-WAVE SOURCELESS RECEIVER

FIELD

The present disclosure relates to millimeter-Wave receivers, including receivers capable of performing direction of arrival estimation.

BACKGROUND

In fifth generation (5G) wireless communication networks, it is expected that the operating frequency will include the sub-millimeter or millimeter-wave (mmW) band. Devices including transmitters and receivers are also expected to be used in multiple-input multiple-output (MIMO) systems and massive MIMO systems, for higher density networks (e.g., in Internet of Things (IoT) networks) as well as remotely-located networks (e.g., for environmental monitoring in rural areas). For remotely-located receivers, there is a challenge in configuring the power network or to replace the receiver batteries.

There is also a challenge in providing a reference signal that is common to all receivers in the network. If each receiver uses its own reference signal, it becomes difficult to synchronize all the receivers. Further, the complexity and cost of providing a feeding network for each receiver increases with the number of receivers. For mmW receivers in particular, a feeding network can lead to high losses at high frequencies.

SUMMARY

The present disclosure describes examples of a mmW sourceless receiver circuit that is a passive circuit, without internal AC or DC sources and related complex feeding networks. Such a passive circuit may exhibit high energy efficiency because it has no loss due to active circuitry. In some examples, the disclosed circuit may also be able to detect the incident angle of a radio frequency (RF) signal, such as using a direction of arrival (DoA) estimation algorithm.

In some aspects, the present disclosure describes a receiver. The receiver includes a planar antenna array including at least three antennas, each antenna being configured for simultaneously receiving a local oscillator (LO) signal from a near field region and a radio frequency (RF) signal from a far field region. Each antenna is coupled to a respective quasi-optical mixer, each quasi-optical mixer including only passive components and outputting a respective intermediate frequency (IF) signal. The receiver also includes at least two six-port demodulators, each six-port demodulator receiving a respective different pair of IF signals as input and outputting signals representing baseband power of the respective pair of IF signals. Each six-port demodulator includes only passive components. The receiver also includes a processor coupled to receive output from the six-port demodulators. The processor is configured to calculate direction of arrival (DoA) for the LO signal and the RF signal using the output from the six-port demodulators.

In any of the preceding aspects/embodiments, each six-port demodulator may include a correlator portion and a power detector portion. The power detector portion may be based on zero-biased schottky diode.

In any of the preceding aspects/embodiments, each quasi-optical mixer may be a zero-biased schottky diode-based mixer.

In any of the preceding aspects/embodiments, the receiver may include a power divider coupled to receive a IF signal from at least one quasi-optical mixer. The power divider may divide the IF signal into two signals for input into the at least two six-port demodulators.

In any of the preceding aspects/embodiments, the processor may be configured to calculate DoA by: calculating phase differences between the respective pairs of IF signals using the output from the six-port demodulators; and calculating the DoA of the LO and RF signals using the phase differences.

In any of the preceding aspects/embodiments, the processor may be configured to calculate the DoA using the phase differences by solving the equations:

$$\begin{cases} \psi_{1,2} = \frac{2\pi}{c}\left(f_L\sqrt{\left(\frac{L_L}{\tan\varphi}-d\right)^2+L_L^2}-f_L\frac{L_L}{\sin\varphi}-f_R d\cos\theta\right) \\ \psi_{2,3} = \frac{2\pi}{c}\left(f_L\sqrt{\left(\frac{L_L}{\tan\varphi}+d\right)^2+L_L^2}-f_L\frac{L_L}{\sin\varphi}+f_R d\cos\theta\right) \end{cases}$$

where $f_L$ and $f_R$ are the frequencies of the LO and RF signals respectively, c is the velocity of light, $\varphi$ and $\theta$ are incident angles of the LO and RF signals with reference to a central antenna of the antenna array, d is linear distance between adjacent antennas in the antenna array, $L_L$ is perpendicular distance between a source of the LO signal and the antenna array, and $\psi_{12}$ and $\psi_{23}$ are phase difference between the respective pairs of IF signals.

In some aspects, the present disclosure describes a method for performing direction of arrival (DoA) estimation. The method includes receiving, at a planar antenna array including at least three antennas, a local oscillator (LO) signal from a near field region and a radio frequency (RF) signal from a far field region simultaneously. Each antenna is coupled to a respective quasi-optical mixer to output a respective intermediate frequency (IF) signal. The method also includes using output signals from at least two six-port demodulators coupled to the quasi-optical mixers, to calculate phase differences between respective pairs of IF signals. The method also includes using the phase differences, to calculate incident angles of the LO signal and the RF signal.

In any of the preceding aspects/embodiments, the output signals from the six-port demodulators may represent baseband power of the IF signals for calculating the phase differences.

In any of the preceding aspects/embodiments, calculating the incident angles may include solving the equations:

$$\begin{cases} \psi_{1,2} = \frac{2\pi}{c}\left(f_L\sqrt{\left(\frac{L_L}{\tan\varphi}-d\right)^2+L_L^2}-f_L\frac{L_L}{\sin\varphi}-f_R d\cos\theta\right) \\ \psi_{2,3} = \frac{2\pi}{c}\left(f_L\sqrt{\left(\frac{L_L}{\tan\varphi}+d\right)^2+L_L^2}-f_L\frac{L_L}{\sin\varphi}+f_R d\cos\theta\right) \end{cases}$$

where $f_L$ and $f_R$ are the frequencies of the LO and RF signals respectively, c is the velocity of light, $\varphi$ and $\theta$ are incident angles of the LO and RF signals with reference to a central antenna of the antenna array, d is linear distance between adjacent antennas in the antenna array, $L_L$ is perpendicular distance between a source of the LO signal and the antenna array, and $\psi_{12}$ and $\psi_{23}$ are the phase difference between the respective pairs of IF signals.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In some examples, the present disclosure describes a receiver circuit that is a passive circuit, having no AC or DC source. The disclosed receiver circuit may be implemented using quasi-optical techniques and a wave-correlator, and may also perform direction of arrival (DoA) estimation. The example circuits described herein may be implemented in millimeter Wave (mmW) receivers, including in receivers that form part of a transceiver.

Figure 1:
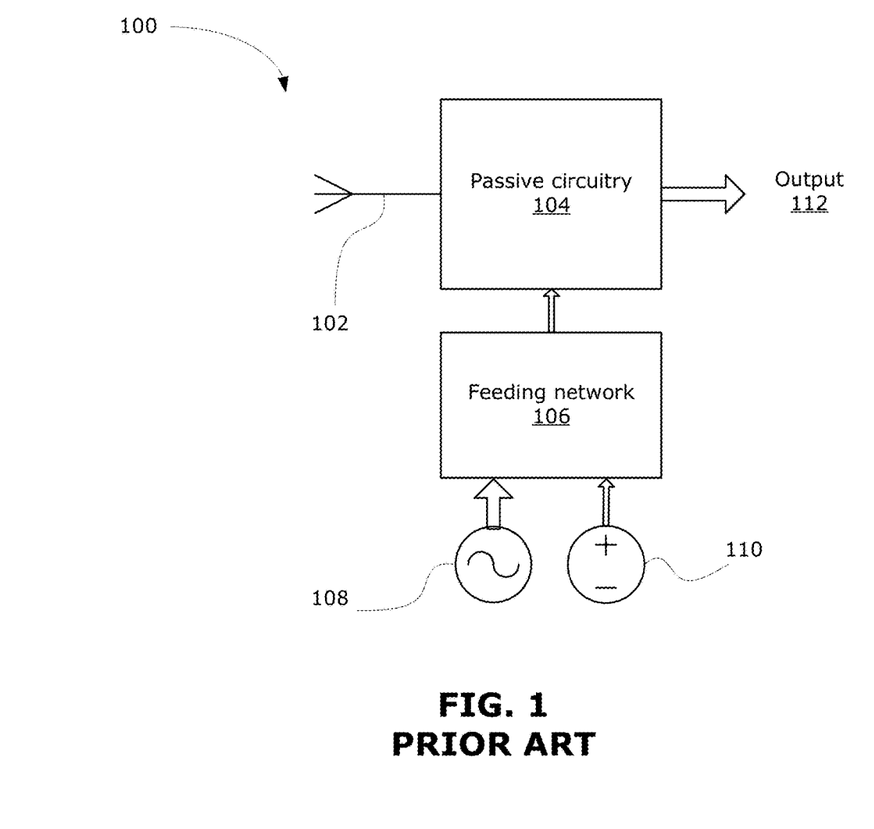
FIG. 1 is a schematic diagram of a conventional receiver with a feeding network.

FIG. 1 is a schematic diagram of an example conventional mmW receiver 100. The example conventional receiver 100 includes an antenna 102 or antenna array (a single antenna 102 is shown for simplicity) for receiving radio frequency (RF) signals, such as high frequency mmW signals. In the present disclosure, mmW signals may also be referred to as high frequency or extremely high frequency signals, and may include signals having frequencies in the range of 100 to 300 GHz, for example.

The received RF signals are processed by passive circuitry 104 to generate an output signal 112. The output signal 112 may be processed by further stages (not shown) of the receiver 100. In the conventional receiver 100, a feeding network 106 is used to feed an internal AC source 108 (e.g., an internal local oscillator (LO)) and an internal DC source 110 to the passive circuitry 104. Typically, a complex and costly feeding network 106 is required. Further, the feeding network 106 typically exhibits high circuit loss at increased operating frequencies.

There have been attempts to improve the conventional mmW receiver. For example, Fukuda et al., "Base station assisted communication system for achieving local-oscillator-less mobile stations" *Radio-Frequency Integration Technology (RFIT)*, 2016 *IEEE International Symposium*, describe a receiver circuit that extracts a LO signal from an external source, instead of using an internal AC source. A continuous wave (CW) signal is received from a base station, and the receiver uses a CW extraction loop to detect the frequency and phase of the CW signal, to be used as a reference LO signal. However, an internal DC source is still required by this circuit. Further, addition of the CW extraction loop (including addition of a CW extraction filter and amplifier) results in increased complexity in the circuit.

In examples disclosed herein, a purely passive receiver circuit is provided. The example disclosed circuit, no internal AC or DC source is required and the feeding network may be eliminated entirely.

Figure 2:
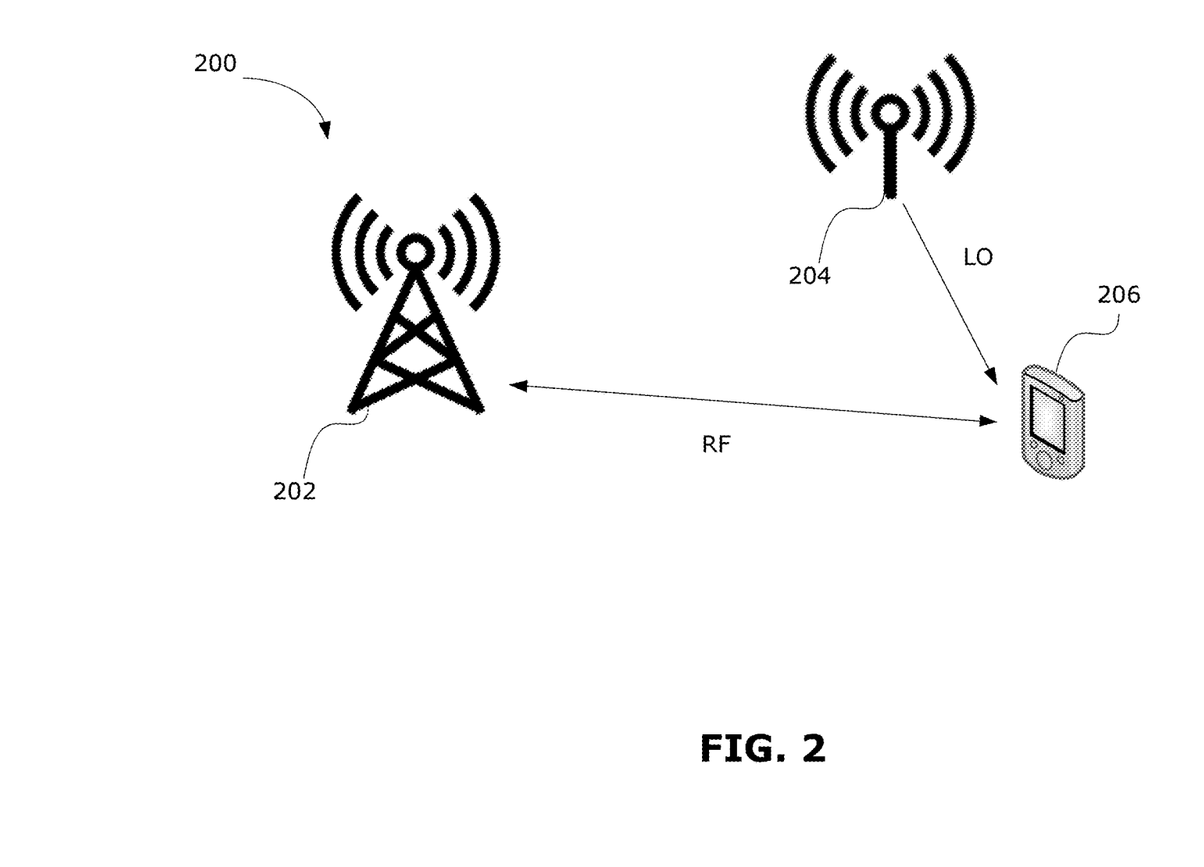
FIG. 2 is a schematic diagram of an example system including an electronic device in which a passive receiver circuit may be implemented.

FIG. 2 is a schematic diagram of an example high frequency communication system 200. The example system 200 includes a RF source 202, for example a first base station, providing a RF signal. The example system 200 also includes a LO source 204, for example a near field communication (NFC) device, providing a LO signal. An electronic device (ED) 206, which may be a transceiver device or a receiver device, receives the RF and LO signals from the external sources 202, 204. In some examples, the LO source 204 may be geographically closer to the ED 206 (e.g., within distance for NFC) than the RF source 202. The ED 206 may be any device suitable for receiving RF signals, in particular high frequency mmW signals, and may also be capable of receiving NFC (e.g., where the LO source 204 is a NFC device.

FIG. 2 illustrates the ED 206 engaged in two-way communication with the RF source 202 and in one-way communication with the LO source 204. In other examples, the ED 206 may also be engaged in two-way communication with the LO source 204. Although only one ED 206 is shown for simplicity, there may be multiple EDs 206 in the system 200. For example, the ED 206 may be also referred to as a terminal, user device, user equipment (UE) or client, for example. For example, any device using mmW communication may benefit from examples disclosed herein. Each ED 206 may be any suitable device capable of wireless communication, including mobile or stationary devices such as smart devices, smartphones, laptops, mobile phones or tablet devices, for example, and the EDs 206 need not be the same as each other. The LO signal is received by all EDs 206 in the coverage area of the LO source 204 and the LO signal serves as a common synchronization signal for those EDs 206 within coverage of the LO source 204.

Figure 3:
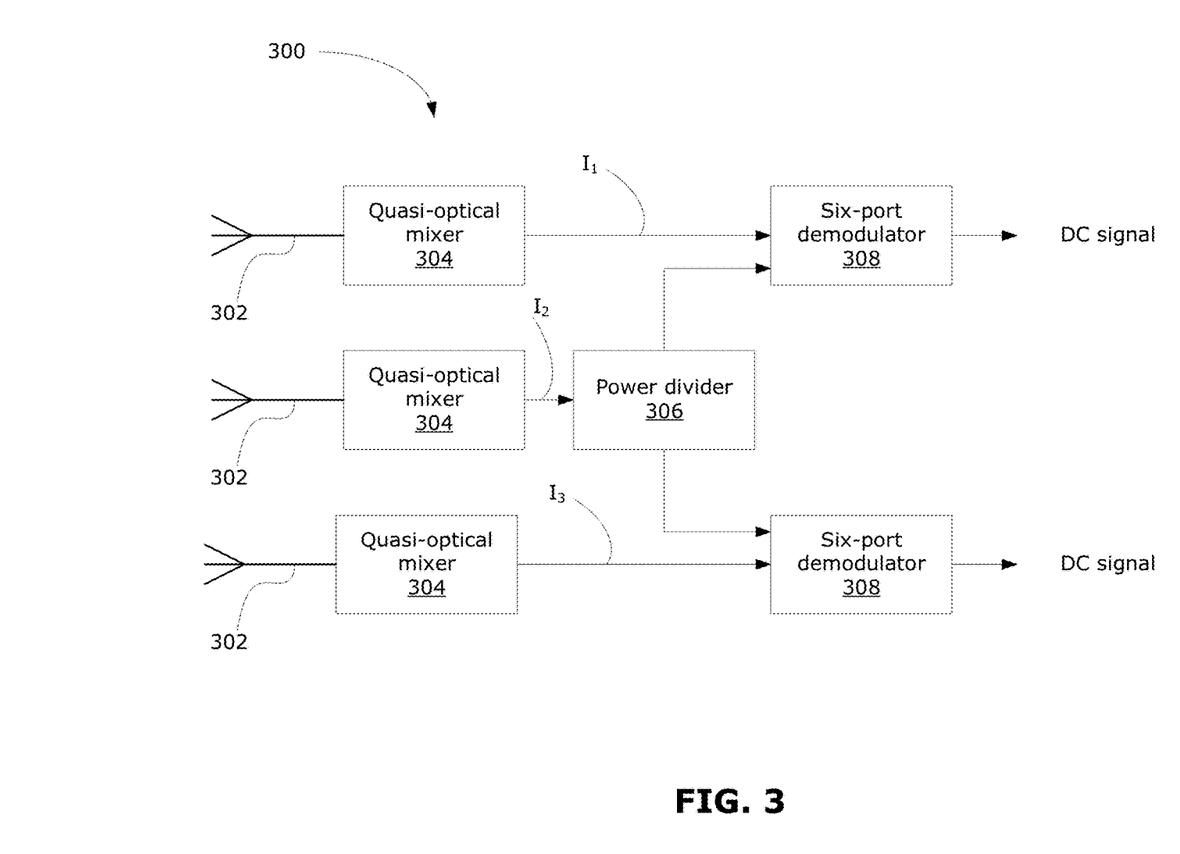
FIG. 3 is a schematic diagram of an example passive receiver circuit.

FIG. 3 is a schematic diagram of an example receiver circuit 300 that may be implemented in an ED 206 in accordance with some aspects of the present disclosure. The example circuit 300 may be implemented as a purely passive circuit, and may exhibit relatively high energy efficiency (that is, little or no circuit loss). Further, the circuit 300 may be used to perform DoA estimation, discussed further below, to determine the incident angle of received LO and RF signals. The components of the receiver circuit 300 may all be provided on a single receiver chip, together with any other components and stages of the receiver.

The receiver circuit 300 includes antennas 302 for receiving a RF signal and a LO signal from external sources (e.g., sources 202, 204). In the example shown, there are three antennas 302, which is sufficient for calculating the incident angle of the RF and LO signals, discussed further below. In other examples, there may be a higher number of antennas 302, for example to increase measurement accuracy, for redundancy and/or for performing 2-dimensional DoA estimation.

The LO signal is transmitted through free space and received by each of the antennas 302. Similarly, the RF signal is transmitted through free space and received by each of the antennas 302. Thus, the RF signal and LO signal are both received by each antenna 302 simultaneously. In most conventional receiver designs, only the RF signal is received from open space. The LO signal may be generated internally or received from a transmission line. Even in some prior approaches where both the LO signal and the RF signal are received from free space, the LO and RF signals are typically at significantly different frequencies. In the example circuit 300, the bandwidth of each receiving antenna 302 is sufficiently wide and the frequencies of the RF and LO signals are sufficiently close together to enable both the RF and LO signals to be received at the same antenna 302 at the same time. Generally, the frequencies of the RF and LO signals may be selected based on two criteria, including the bandwidth of the receiving antennas 302 and the characteristics of the demodulator (described below). The frequencies of the RF and LO signals should be selected to be received efficiently by the receiving antennas 302. As well, the size of the demodulator can be decreased when the absolute value of the frequency difference between the RF and LO signals increases. For example, for receiving antennas 302 having relative bandwidth of 10%, the RF and LO signals may be at opposite ends of the bandwidth, such that the ratio of RF signal frequency to LO signal frequency is about 0.9-1.1.

Generally, the RF and LO signals may be received from the same or different signal paths. For example, the LO signal may be transmitted through free space using near field techniques, and the RF signal may be transmitted through free space using far field or near field techniques.

Each antenna 302 is coupled to a respective quasi-optical mixer 304. The quasi-optical mixer 304 may be a zero-biased schottky diode-based mixer. In some examples, any diode with good square-law detection function for a low power signal may be used. The use of a zero-biased diode may enable the quasi-optical mixer 304 to operate without the need for DC power. Each quasi-optical mixer 304 serves to mix the received RF and LO signals from each respective antenna 302. In this example, the output from the three quasi-optical mixers 304 are the intermediate frequency (IF) signals $I_1$, $I_2$, $I_3$. Although each antenna 302 receives the same RF and LO signals, because of physical spacing of the antennas 302, the incident angles of the received signals (e.g., at least the LO signal) are non-negligibly different between the antennas 302 and thus the IF signals $I_1$, $I_2$, $I_3$ differ from each other. This may be used for DoA estimation, as discussed further below.

The receiver circuit 300 includes a power divider 306 coupled to at least one quasi-optical mixer 304. The power divider 306 serves to split the output from one quasi-optical mixer 304 for input into both six-port demodulators 308. In the example shown, IF signal $I_2$ is split, however the power divider 306 may be coupled to any of the quasi-optical mixers 304 to split any of the IF signals $I_1$, $I_2$, $I_3$.

The receiver circuit 300 includes six-port demodulators 308. Each six-port demodulator 308 receives a pair of IF signals as input. In the example shown, the power divider 306 is used to split IF signal $I_2$ to be inputted into each of two demodulators 308. Thus, in the example shown, one six-port demodulator 308 receives IF signals $I_1$ and $I_2$, and the other six-port demodulator 308 receives IF signals $I_2$ and $I_3$. In other examples, different combinations of the IF signals may be received by the demodulators 308. Each demodulator 308 performs correlation of the respective input IF signals and also performs power detection, outputting DC signals. The output from the modulators 308 may be used by further stages (not shown) of the receiver.

The received LO signal serves as the synchronization signal for the receiver circuit 300. Notably, the LO signal is received by all receivers within coverage of the LO source 204 (see FIG. 2) and serves as a common synchronization signal for all such receivers. The LO signal may also serve as a power supply for the receiver circuit 300, for example serving as an AC source for the quasi-optical mixers 304.

Figure 4:
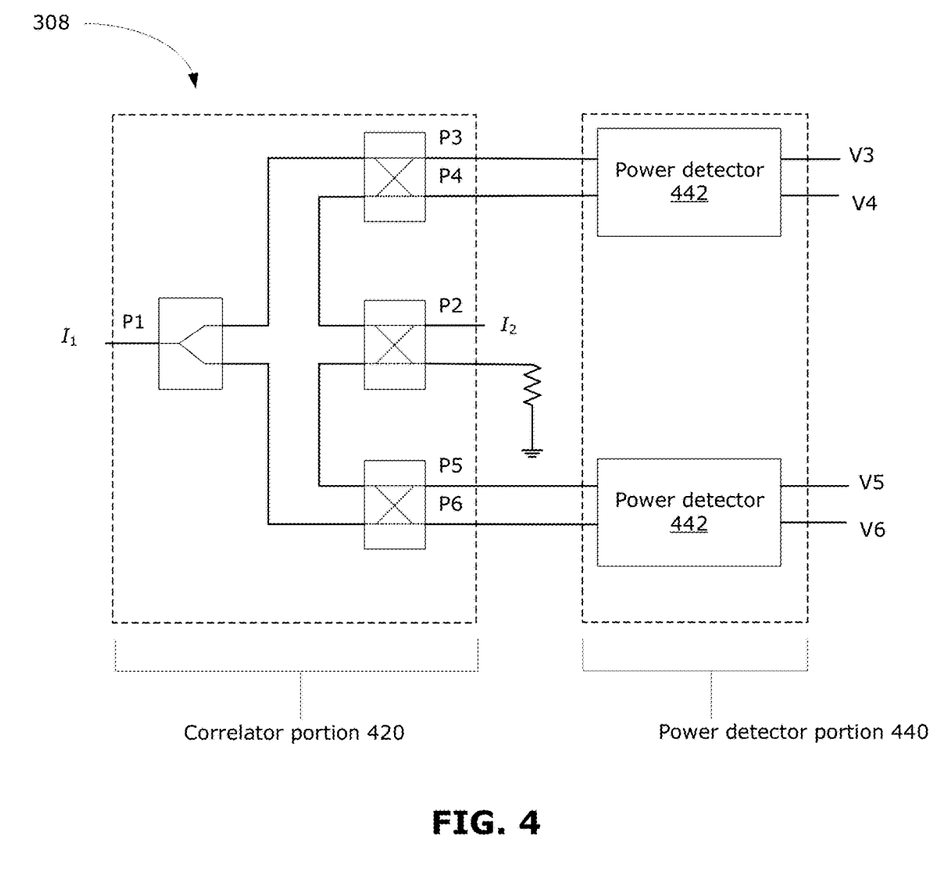
FIG. 4 is a schematic diagram of an example six-port demodulation that may be used to implement a passive receiver circuit.

FIG. 4 is a schematic diagram showing an example implementation of the six-port demodulator 308. In FIG. 4, one of the two demodulators 308 of FIG. 3 is shown in detail. The demodulator 308 shown in FIG. 4 receives the IF signals $I_1$ and $I_2$ at its input ports P1, P2. The other demodulator 308 of the circuit 300 in FIG. 3 may be similarly configured, and receives the IF signals $I_2$ and $I_3$ instead.

The six-port demodulator 308 shown in FIG. 4 includes a correlator portion 420 and a power detector portion 440. The correlator portion 420 may use any suitable six-port correlator configuration, for example a six-port correlator as described by de la Moran-Ávarez-Palencia et al., "Broadband RF front-end based on the six-port network architecture for software defined radio", *MILCOM* 2010 *IEEE*, incorporated herein by reference. The output of the correlator portion 420 is provided at ports P3, P4, P5, P6 to the power detector portion 440.

The power detector portion 440 serves to recover the carrier baseband signal. The power detector portion 440 includes power detectors 442. Each power detector 442 is based on the use of zero-biased schottky diodes, to enable the power detector portion 440 to be driven using the output from the correlator portion 420, without requiring any DC bias. The power detector 442 may include other suitable components, such as filters, to perform the power detection, however these other components are also passive. Output of the power detector portion 440 are the DC signals V3-V6, which may be used for DoA calculations described below.

Thus, the demodulator 308 may be entirely passive, eliminating the need for AC and DC feeding networks.

In some examples, a DoA estimation algorithm may be implemented using the disclosed circuit. A typical conventional DoA estimation in a six-port network is based on calculating the phase difference between two received signals from two antennas. In the example disclosed circuit, an external LO signal is additionally received, and the incident angle of the LO signal may also need to be determined. In particular, in some examples the LO signal may come from a LO source 204 that is in the near field region (e.g., within about 5 to 10 wavelengths of the LO signal) of the receiving antenna of the ED 206 (see FIG. 2), and DoA estimation of the LO signal may need to take this into account.

The DoA estimation method described below may be performed by a processor of the receiver receiving signals from the receiver circuit 300. For example, the DC signals outputted by the demodulators 308 may be fed into a processor for performing the DoA estimation. The processor may be provided on the same chip as the receiver circuit 300, for example.

In the example described below, it is assumed that there are three receiving antennas on an ED 206 receiving the RF and LO signals. It is assumed that the RF source 202 is located in the far field region of the receiving antenna of the ED 206, with the effect that the RF signal may be treated as a planar wave in the DoA estimation. If the RF signal is from an RF source in the near field region of the receiving antenna, an additional one or more antennas may be added to estimate the incident angle of the RF signal.

Figure 5:
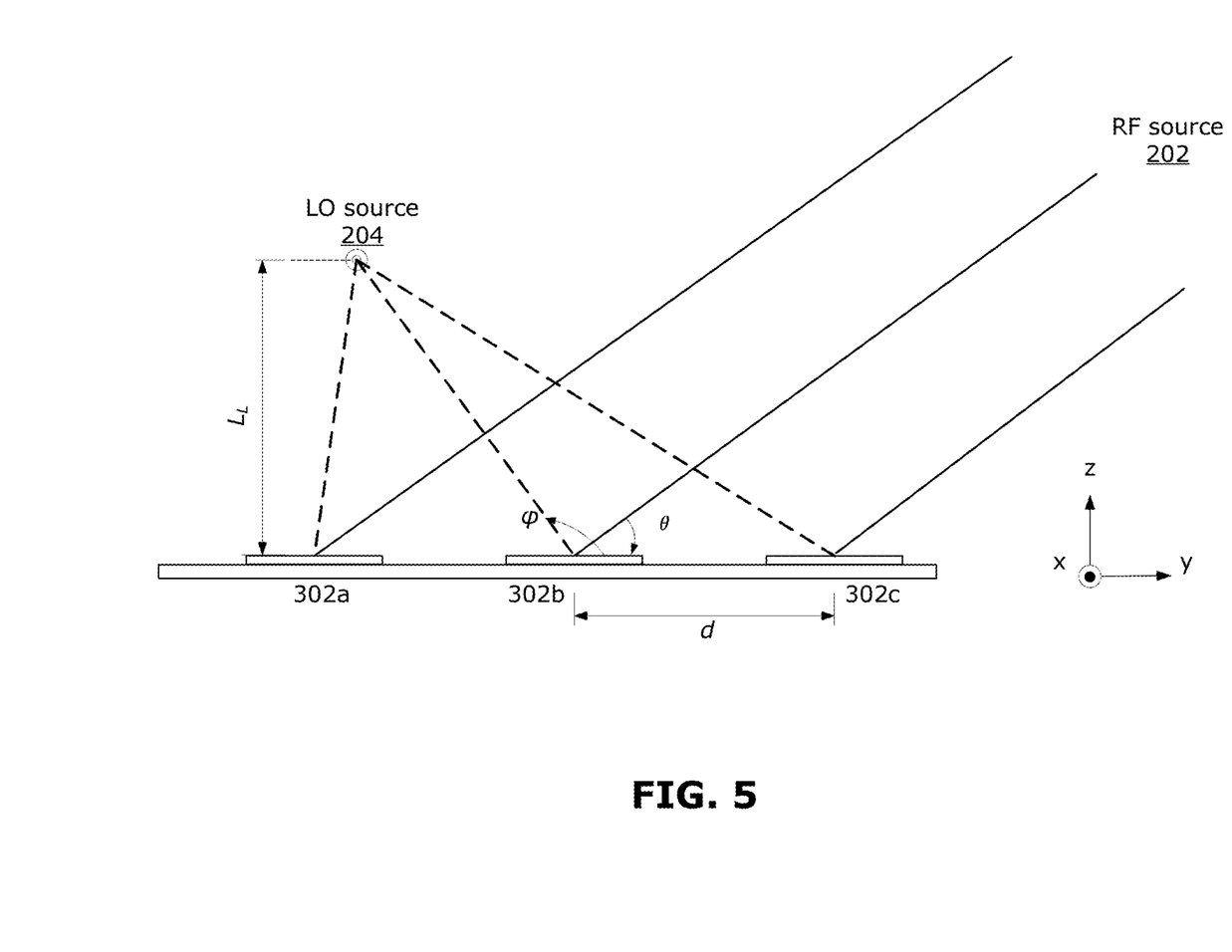
FIG. 5 is a diagram illustrating incident angles of different signals received by receiver antennas.

An example method for performing DoA estimation is described below with reference to FIG. 5, which shows an example layout of the receiving antennas 302a, 302b, 302c (collectively, antennas 302) that receive the LO and RF signals. The antennas 302 form a planar antenna array. The three antennas 302 in this example are distributed evenly along a line with a spacing of d (calculated from the mid-point of each antenna 302). The LO source 204 is located at a certain location in the open space, in the near field region of the antennas 302. The location of the LO source 204 relative to the antennas 302 may be known and fixed, for example the LO source 204 and the antennas 302 may be provided together in the same physical structure (e.g., an apparatus containing a single LO source 204 and multiple receivers). The RF source 202 is located at an arbitrary location in the far field region of the antennas 302. Because the RF source 202 is at a far distance from the antennas 302, the RF signal may be treated as a planar wave in the DoA estimation.

Each antenna 302 receives LO and RF signals simultaneously. Each antenna is coupled to a quasi-optical mixer 304 (see FIG. 3) where the received RF and LO signals are mixed to yield the IF signals $I_1$, $I_2$ and $I_3$. According to the geometry shown in FIG. 5, the difference in the DoA of the LO signal at each antenna 302 cannot be neglected because the LO source is located close to the antennas 302. However, the difference in the DoA of the RF signal at each antenna 302 can be neglected because d is much smaller than the distance between the RF source 202 and the antennas 302 (e.g., at least larger than 10×d). It may further be assumed that the LO source 204 is a point source of the LO signal. Therefore, in the DoA estimation, the RF signal may be treated as a plane wave and the LO signal may be treated as a spherical wave. The relationship between the IF signals $I_1$, $I_2$, $I_3$ and the RF and LO signals can be expressed by equation (1) below:

$$\begin{cases} I_1 = A_1\cos(\Delta\omega t + \Phi_1) = A_1\cos \\ \quad \left[\Delta\omega t + \frac{2\pi}{c}\left(f_L\sqrt{\left(\frac{L_L}{\tan\varphi} - d\right)^2 + L_L^2} - f_R d\cos\theta\right)\right] \\ I_2 = A_2\cos(\Delta\omega t + \Phi_2) = A_2\cos \\ \quad \left[\Delta\omega t + \frac{2\pi}{c}\left(f_L\frac{L_L}{\sin\varphi}\right)\right] \\ I_3 = A_3\cos(\Delta\omega t + \Phi_3) = A_3\cos \\ \quad \left[\Delta\omega t + \frac{2\pi}{c}\left(f_L\sqrt{\left(\frac{L_L}{\tan\varphi} + d\right)^2 + L_L^2} + f_R d\cos\theta\right)\right] \end{cases} \quad (1)$$

In equation (1), $f_L$ and $f_R$ stands for the frequency of the LO and RF signals respectively; $\Delta\omega$ is the difference of angular frequencies between the LO and RF signals; c is the velocity of light; $\varphi$ and $\theta$ are the incident angles of the LO and RF signals with reference to the central antenna 302b; $L_L$ is the perpendicular distance between the LO source 204 and the antennas 302; and $A_n$ and $\Phi_n$ (where n=1, 2, 3) are the amplitude and phase of the three IF signals $I_1$, $I_2$, $I_3$, respectively.

In application, the parameters described above are known prior to detection of the LO and RF signals, except for time factor t and the incident angles $\varphi$ and $\theta$ ($A_n$ and $\Phi_n$ are non-independent intermediate variables that do not need to be independently solved). The six-port demodulators 308 of FIG. 3 are utilized to calculate these unknown parameters.

The two demodulators 308 share the same configuration, but process different IF signals. Each demodulator 308 serves to detect the phase difference between the two input IF signals, which have the same frequency, using the six-port network and power detectors shown in FIG. 4.

The phase difference between the IF signals $I_1$ and $I_2$ (denoted as $\psi_{12}$) is detected by a first demodulator 308, and the phase difference between the IF signals $I_2$ and $I_3$ (denoted as $\psi_{23}$) is detected by a second demodulator 308. The phase differences may be represented by equation (2) below:

$$\begin{cases} \psi_{12} = \Phi_1 - \Phi_2 \\ \psi_{23} = \Phi_2 - \Phi_3 \end{cases} \quad (2)$$

where $\Phi_1$ to $\Phi_3$ are the phases of the three IF signals $I_1$ to $I_3$, respectively. After baseband reconstruction in the power detector portion 440 of the demodulator 308, the phase difference between the input IF signals at the input ports P1 and P2 (see FIG. 4) can be derived by:

$$\begin{cases} \psi_{12} = \arctan\left(\frac{V_3 - V_4}{V_5 - V_6}\right) \\ \psi_{23} = \arctan\left(\frac{V_9 - V_{10}}{V_{11} - V_{12}}\right) \end{cases} \quad (3)$$

where $V_3$ to $V_6$ are the DC voltages at the output ports P3 to P6 of the demodulator 308, when the input at the input ports P1 and P2 are IF signals $I_1$ and $I_2$. $V_9$ to $V_{12}$ are the DC voltages at the output ports P3 to P6 of the demodulator 308, when the input at the input ports P1 and P2 are IF signals $I_2$ and $I_3$ (not shown in FIG. 4). Using the DC voltages at the output ports of the two demodulators 308, phase differences $\psi_{12}$ and $\psi_{23}$ may be calculated. When equation (1) is substituted into equation (2), the result is equation (4) below:

$$\begin{cases} \psi_{1,2} = \frac{2\pi}{c}\left(f_L\sqrt{\left(\frac{L_L}{\tan\varphi} - d\right)^2 + L_L^2} - f_L\frac{L_L}{\sin\varphi} - f_R d\cos\theta\right) \\ \psi_{2,3} = \frac{2\pi}{c}\left(f_L\sqrt{\left(\frac{L_L}{\tan\varphi} + d\right)^2 + L_L^2} - f_L\frac{L_L}{\sin\varphi} + f_R d\cos\theta\right) \end{cases} \quad (4)$$

Here, the time factor t has been eliminated by use of the correlator portion 420 of the demodulators 308. The unknown parameters $\varphi$ and $\theta$ can then be calculated using the two independent equations in equation (4). Thus, the method described above may be used to perform DoA estimation to determine the incident angle $\theta$ of the RF signal and the incident angle $\varphi$ of the LO signal, using the eight output DC voltages, V3 to V6 and V9 to V12, from the two demodulators 308. DoA estimation may be used for functions such as target tracing and beamforming. Determination of incident angles may also be used to control or adjust the beam location of an antenna array, for example.

Figure 6:
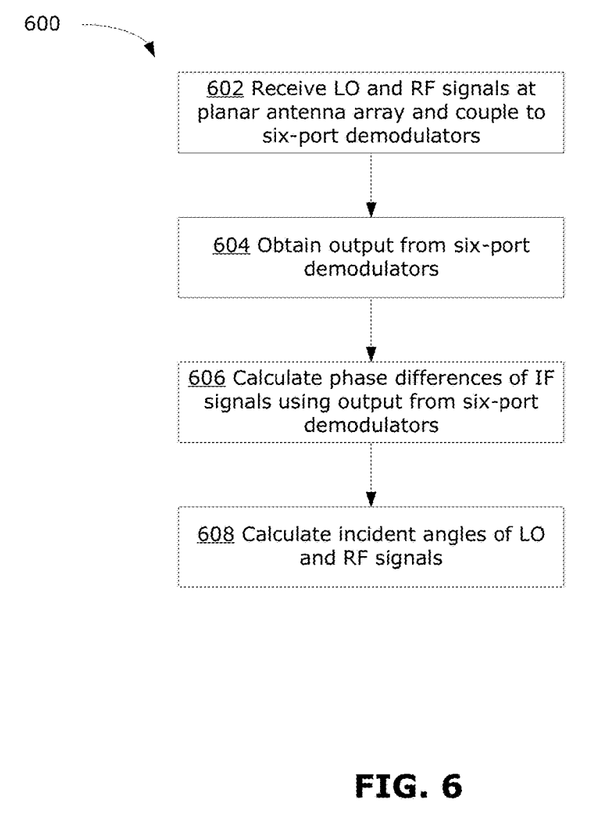
FIG. 6 is a flowchart illustrating an example method for performing direction of arrival estimation, using the example circuit of FIG. 3.

FIG. 6 is a flowchart illustrating an example method 600 for performing DoA estimation. The example method 600 may be implemented using the example circuit described above.

At 602, a LO signal and a RF signal are both received simultaneously at a planar array of antennas. The planar array may include at least three antennas evenly spaced along a line, for example. The LO signal is received from a near field region of the antennas and the RF signal is received from a far field region of the antennas. Each antenna receives the LO signal and the RF signal simultaneously.

The antennas are coupled to respective quasi-optical mixers, and the IF signals from the quasi-optical mixers are coupled to six-port demodulators, as described above. Notably, the antennas are coupled to the six-port demodulators via passive circuits and the six-port demodulators are themselves also passive (i.e., not requiring AC or DC sources).

At 604, output from the six-port demodulators are obtained. The output of each six-port demodulator is a DC signal representing baseband power of the respective pair of input IF signals.

At 606, the phase differences between respective pairs of IF signals are calculated, using the output from the six-port demodulators. This may be calculated using the example equations described above.

At 608, the incident angles of the LO and RF signals are calculated using the phase differences, for example using the example equations described above.

In some examples disclosed herein, a receiver circuit is described that may be suitable for receivers in a large scale communication network. The disclosed receiver circuit may be implemented without a feeding network, and may omit the need for a power source (e.g., batteries). The disclosed receiver circuit may be easier to maintain than conventional receiver circuits, which may be useful in applications where the receiver is located remotely (e.g., in rural locations or remote monitoring stations). Using examples disclosed herein, receivers of a MIMO system or massive MIMO system may all operate using the same LO reference signal.

The example circuits described herein show three antennas being used to receive the RF and LO signals. However, a different number of antennas may be used (e.g., for redundancy, greater accuracy or to calculate 2D DoA). For example, to calculate 2D DoA, the antennas may be placed along two orthogonal lines instead of along the same line as described above. If more than three antennas are used, the layout shown in FIG. 3 may be modified to accommodate the additional antenna(s) by duplicating the appropriate components.

Although described in the context of mmW wireless communications, the examples disclosed herein may be useful in other applications where a passive receiver circuit would be desirable.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A receiver comprising:
a planar antenna array including at least three antennas, each antenna being configured for simultaneously receiving a local oscillator (LO) signal from a near field region and a radio frequency (RF) signal from a far field region;
each antenna being coupled to a respective quasi-optical mixer, each quasi-optical mixer including only passive components and outputting a respective intermediate frequency (IF) signal;
at least two six-port demodulators, each six-port demodulator receiving a respective different pair of IF signals as input and outputting signals representing baseband power of the respective pair of IF signals, each six-port demodulator including only passive components; and
a processor coupled to receive output from the six-port demodulators, the processor being configured to calculate direction of arrival (DoA) for the LO signal and the RF signal using the output from the six-port demodulators.

2. The receiver of claim 1, wherein each six-port demodulator comprises:
a correlator portion; and
a power detector portion, wherein the power detector portion is based on zero-biased schottky diode.

3. The receiver of claim 1, wherein each quasi-optical mixer is a zero-biased schottky diode-based mixer.

4. The receiver of claim 1, further comprising:
a power divider coupled to receive a IF signal from at least one quasi-optical mixer, the power divider dividing the IF signal into two signals for input into the at least two six-port demodulators.

5. The receiver of claim 1, wherein the processor is configured to calculate DoA by:
calculating phase differences between the respective pairs of IF signals using the output from the six-port demodulators; and
calculating the DoA of the LO and RF signals using the phase differences.

6. The receiver of claim 1, wherein the processor is configured to calculate the DoA using the phase differences by solving the equations:

$$\begin{cases} \psi_{1,2} = \frac{2\pi}{c}\left(f_L\sqrt{\left(\frac{L_L}{\tan\varphi}-d\right)^2+L_L^2}-f_L\frac{L_L}{\sin\varphi}-f_R d\cos\theta\right) \\ \psi_{2,3} = \frac{2\pi}{c}\left(f_L\sqrt{\left(\frac{L_L}{\tan\varphi}+d\right)^2+L_L^2}-f_L\frac{L_L}{\sin\varphi}+f_R d\cos\theta\right) \end{cases}$$

where $f_L$ and $f_R$ are the frequencies of the LO and RF signals respectively, c is the velocity of light, $\varphi$ and $\theta$ are incident angles of the LO and RF signals with reference to a central antenna of the antenna array, d is linear distance between adjacent antennas in the antenna array, $L_L$ is perpendicular distance between a source of the LO signal and the antenna array, and $\psi_{1,2}$ and $\psi_{2,3}$ are phase difference between the respective pairs of IF signals.

7. A method for performing direction of arrival (DoA) estimation, the method comprising:

receiving, at a planar antenna array including at least three antennas, a local oscillator (LO) signal from a near field region and a radio frequency (RF) signal from a far field region simultaneously, each antenna being coupled to a respective quasi-optical mixer to output a respective intermediate frequency (IF) signal;

using output signals from at least two six-port demodulators coupled to the quasi-optical mixers, calculate phase differences between respective pairs of IF signals; and using the phase differences, calculate incident angles of the LO signal and the RF signal.

8. The method of claim 7, wherein the output signals from the six-port demodulators represent baseband power of the IF signals for calculating the phase differences.

9. The method of claim 7, wherein calculating the incident angles comprises solving the equations:

$$\begin{cases} \psi_{1,2} = \frac{2\pi}{c}\left(f_L\sqrt{\left(\frac{L_L}{\tan\varphi} - d\right)^2 + L_L^2} - f_L\frac{L_L}{\sin\varphi} - f_R d\cos\theta\right) \\ \psi_{2,3} = \frac{2\pi}{c}\left(f_L\sqrt{\left(\frac{L_L}{\tan\varphi} + d\right)^2 + L_L^2} - f_L\frac{L_L}{\sin\varphi} + f_R d\cos\theta\right) \end{cases}$$

where $f_L$ and $f_R$ are the frequencies of the LO and RF signals respectively, c is the velocity of light, $\varphi$ and $\theta$ are incident angles of the LO and RF signals with reference to a central antenna of the antenna array, d is linear distance between adjacent antennas in the antenna array, $L_L$ is perpendicular distance between a source of the LO signal and the antenna array, and $\psi_{1,2}$ and $\psi_{2,3}$ are the phase difference between the respective pairs of IF signals.

* * * * *